United States Patent
Homma et al.

(10) Patent No.: US 12,493,009 B2
(45) Date of Patent: Dec. 9, 2025

(54) HYDROGEN SENSOR

(71) Applicant: Nuvoton Technology Corporation Japan, Kyoto (JP)

(72) Inventors: Kazunari Homma, Gifu (JP); Satoru Ito, Hyogo (JP); Koji Katayama, Nara (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 136 days.

(21) Appl. No.: 18/409,599

(22) Filed: Jan. 10, 2024

(65) Prior Publication Data

US 2024/0175837 A1     May 30, 2024

Related U.S. Application Data

(63) Continuation of application No. PCT/JP2022/029406, filed on Jul. 29, 2022.

(30) Foreign Application Priority Data

Aug. 11, 2021  (JP) ................................. 2021-130998

(51) Int. Cl.
  *G01N 27/12* (2006.01)
(52) U.S. Cl.
  CPC ................... *G01N 27/122* (2013.01)
(58) Field of Classification Search
  CPC .................................................... G01N 27/122
  USPC ...................................................... 324/693
  See application file for complete search history.

(56) References Cited

U.S. PATENT DOCUMENTS

| 5,372,785 A | * | 12/1994 | Johnson | ................. G01N 27/12 422/90 |
| 2017/0276626 A1 | * | 9/2017 | Wei | ...................... G01N 27/125 |
| 2019/0385982 A1 | * | 12/2019 | Lee | ......................... H01L 24/32 |

FOREIGN PATENT DOCUMENTS

JP      2018-119846 A      8/2018

OTHER PUBLICATIONS

International Search Report (ISR) issued on Oct. 18, 2022 in International (PCT) Application No. PCT/JP2022/029406 w/English Translation.

* cited by examiner

*Primary Examiner* — Alesa Allgood
*Assistant Examiner* — Rahul Maini
(74) *Attorney, Agent, or Firm* — Rimon P.C.

(57) ABSTRACT

A hydrogen sensor includes a first electrode that is a planar electrode; a second electrode that is a planar electrode facing the first electrode and includes an exposed portion to be exposed to a gas containing hydrogen; a metal oxide layer disposed between the two facing surfaces of the first electrode and the second electrode and having the resistance value that is changed by the exposed portion being exposed to the gas; a first terminal, a second terminal, and a heat dissipation portion spaced apart from each other; one or more first vias provided above the second electrode and electrically connected to the first terminal and the second electrode; one or more second vias provided above the second electrode and electrically connected to the second terminal and the second electrode; and one or more third vias above the second electrode and in contact with the heat dissipation portion.

15 Claims, 8 Drawing Sheets

FIG. 4

| Current [mA] | Temperature of exposed portion [°C] | | Temperature of first via [°C] | | Temperature difference between exposed portion and first via [°C] | |
|---|---|---|---|---|---|---|
| | Comparison example | Example | Comparison example | Example | Comparison example | Example |
| 1 | 25.3 | 25.2 | 25.2 | 25.1 | 0.1 | 0.1 |
| 5 | 31.4 | 29 | 29.8 | 26.4 | 1.6 | 2.6 |
| 10.2 | 52.9 | 42 | 46.1 | 31 | 6.8 | 11 |
| 15 | 90.7 | 63.3 | 74.3 | 38.2 | 16.4 | 25.1 |
| 20 | 158.6 | 98.6 | 124.1 | 49.7 | 34.5 | 48.9 |
| 25 | 279.7 | 151.9 | 211.3 | 66.3 | 68.4 | 85.6 |
| 30 | 482.8 | 233.4 | 359.2 | 90.4 | 123.6 | 143 |

HYDROGEN SENSOR

CROSS REFERENCE TO RELATED APPLICATIONS

This is a continuation application of PCT International Application No. PCT/JP2022/029406 filed on Jul. 29, 2022, designating the United States of America, which is based on and claims priority of Japanese Patent Application No. 2021-130998 filed on Aug. 11, 2021. The entire disclosures of the above-identified applications, including the specifications, drawings and claims are incorporated herein by reference in their entirety.

FIELD

The present disclosure relates to a hydrogen sensor.

BACKGROUND

Japanese Unexamined Patent Application Publication No. 2018-119846 discloses a heat conduction gas sensor for detecting a target gas.

CITATION LIST

Patent Literature

PTL 1: Japanese Unexamined Patent Application Publication No. 2018-119846

SUMMARY

Technical Problem

However, the heat conduction gas sensor disclosed in Japanese Unexamined Patent Application Publication No. 2018-119846 is heated to around several hundred degrees Celsius to detect a gas, and thus consumes a very large power of around 100 mW. Furthermore, the heat conduction gas sensor detects hydrogen with low accuracy.

Thus, the present disclosure provides a low-power-consumption hydrogen sensor that can detect hydrogen with high accuracy.

Solution to Problem

A hydrogen sensor according to one aspect of the present disclosure includes: a first electrode that is a planar electrode; a second electrode that is a planar electrode facing the first electrode and includes an exposed portion to be exposed to a gas containing hydrogen; a metal oxide layer interposed between the two facing surfaces of the first electrode and the second electrode and having the resistance value that is changed by the exposed portion being exposed to the gas; a first terminal, a second terminal, and a heat dissipation portion spaced apart from each other; one or more first vias provided above the second electrode and electrically connected to the first terminal and the second electrode; one or more second vias provided above the second electrode and electrically connected to the second terminal and the second electrode; and one or more third vias that are provided above the second electrode and are in contact with the heat dissipation portion.

A hydrogen sensor according to another aspect of the present disclosure includes: a first electrode that is a planar electrode; a second electrode that is a planar electrode facing the first electrode and includes an exposed portion to be exposed to a gas containing hydrogen; a metal oxide layer interposed between the two facing surfaces of the first electrode and the second electrode and having the resistance value that is changed by the exposed portion being exposed to the gas; a first terminal, a third terminal, and a heat dissipation portion spaced apart from each other; one or more first vias provided above the second electrode and electrically connected to the first terminal and the second electrode; one or more fourth vias provided below the first electrode and electrically connected to the third terminal and the first electrode; and one or more third vias that are provided above the second electrode and are in contact with the heat dissipation portion.

A hydrogen sensor according to still another aspect of the present disclosure includes: a first electrode that is a planar electrode; a second electrode that is a planar electrode facing the first electrode and includes an exposed portion to be exposed to a gas containing hydrogen; a metal oxide layer interposed between the two facing surfaces of the first electrode and the second electrode and having the resistance value that is changed by the exposed portion being exposed to the gas; a first terminal, a second terminal, a third terminal, and a heat dissipation portion spaced apart from each other; one or more first vias provided above the second electrode and electrically connected to the first terminal and the second electrode; one or more second vias provided above the second electrode and electrically connected to the second terminal and the second electrode; one or more third vias that are provided above the second electrode and are in contact with the heat dissipation portion; and one or more fourth vias provided below the first electrode and electrically connected to the third terminal and the first electrode.

Advantageous Effects

The hydrogen sensor according to the present disclosure is a low-power-consumption hydrogen sensor that can detect hydrogen with high accuracy.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 4 illustrates a table showing the results of temperature simulation of a hydrogen sensor according to an example and the hydrogen sensor according to the comparison example.

DESCRIPTION OF EMBODIMENTS

Figure 1:
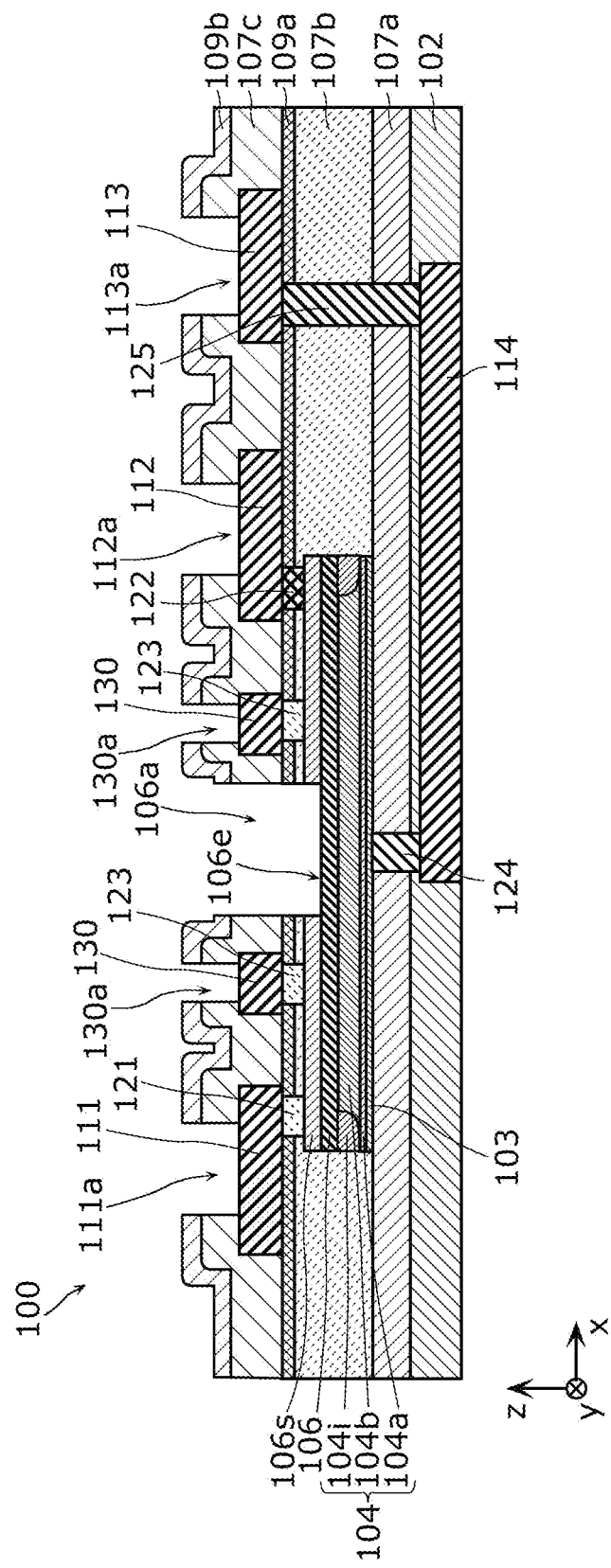
FIG. 1 is a cross-sectional view illustrating a configuration example of a hydrogen sensor according to Embodiment 1.

Embodiments are described below in detail with reference to the figures. It should be noted that the embodiments described below show general or specific examples. The numerical values, shapes, materials, structural elements, the arrangement and connection of the structural elements, steps, order of the steps, and other descriptions indicated in the following embodiments are mere examples, and therefore do not intend to limit the present disclosure. In addition, among the structural elements described in the following embodiments, those not recited in any of the independent claims are described as optional structural elements.

The drawings are schematic views and are not necessarily precise illustrations. In the drawings, substantially the same structural elements are assigned the same reference symbol, and overlapping explanations are omitted or simplified.

In the Specification, the terms above and below used to describe the configuration of a hydrogen sensor do not indicate the upward direction (vertically upward) or the downward direction (vertically downward) in absolute spatial recognition, but are terms determined in a relative positional relationship based on the stacking order in a stacked structure. In addition, the terms above and below are used not only when two structural elements are provided with a space therebetween and another structural element is present between the two structural elements, but also when two structural elements are provided without any space therebetween and are in contact with each other.

In the Specification and Drawings, the x-axis, the y-axis, and the z-axis indicate the three axes of a three-dimensional orthogonal coordinate system. In the embodiments, the two axes parallel to the planar, first electrode of a hydrogen sensor are the x-axis and the y-axis, and the direction perpendicular to the first electrode is the z-axis.

In addition, the expression in plan view used in the Specification means that the first electrode of the hydrogen sensor is viewed in the positive direction of the z-axis.

Embodiment 1

Configuration

Figure 2:
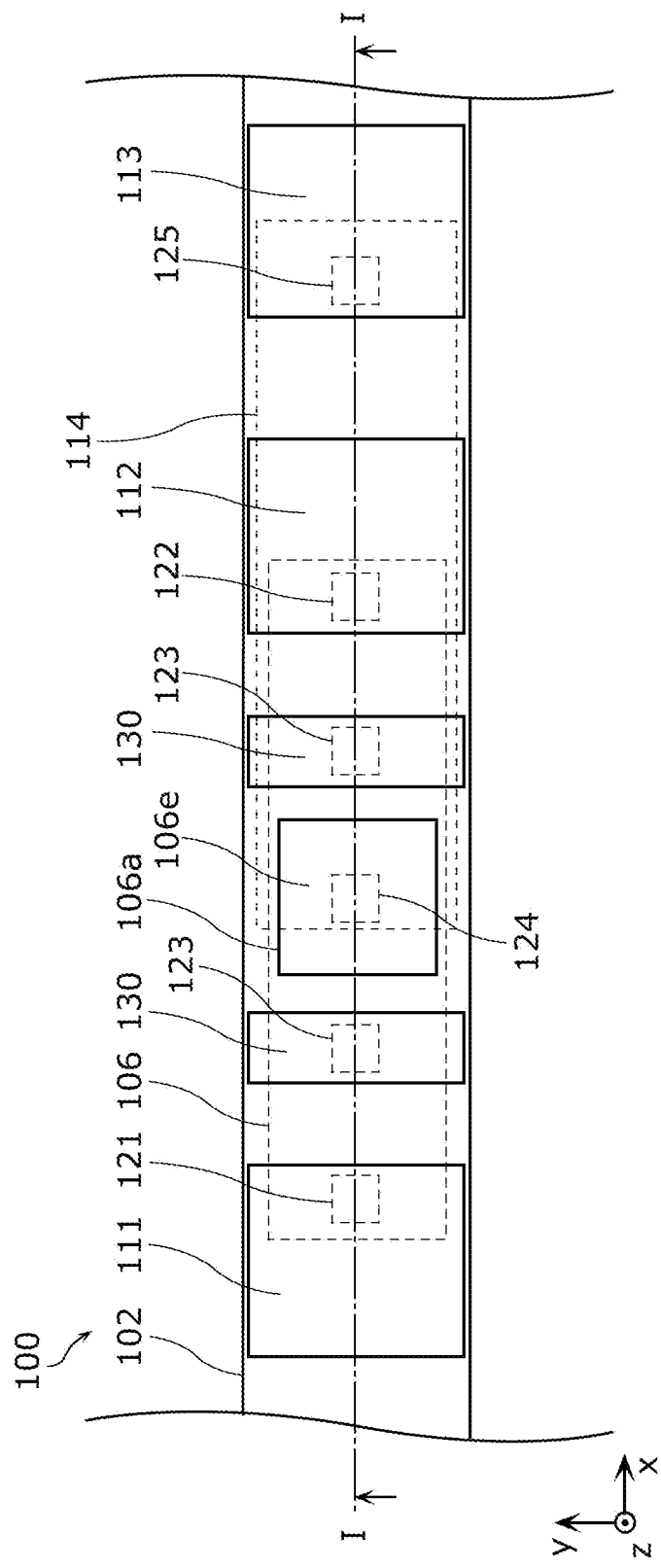
FIG. 2 is a plan view illustrating a configuration example of the hydrogen sensor according to Embodiment 1.

FIG. 1 is a cross-sectional view illustrating a configuration example of hydrogen sensor 100 according to Embodiment 1. FIG. 2 is a plan view illustrating a configuration example of hydrogen sensor 100 according to Embodiment 1. It should be noted that FIG. 1 illustrates a cross section taken along line I-I in FIG. 2.

Hydrogen sensor 100 according to Embodiment 1 is a hydrogen sensor for detecting hydrogen. Hydrogen sensor 100 includes first electrode 103, metal oxide layer 104, second electrode 106, metal layer 106s, first via 121, second via 122, two third vias 123, fourth via 124, fifth via 125, first terminal 111, second terminal 112, third terminal 113, two heat dissipation portions 130, and line 114. Hydrogen sensor 100 further includes insulating layers 102, 107a, 107b, 107c, 109a, and 109b that cover the above structural elements. The insulating layers have openings 106a, 111a, 112a, and 113a, and two openings 130a. It should be noted that for simplification, FIG. 2 does not illustrate the insulating layers except for insulating layer 102.

First electrode 103 is a planar electrode and has, as its two surfaces, a top surface (the surface on the positive side of the z-axis) and a bottom surface (the surface on the negative side of the z-axis). The top surface of first electrode 103 is in contact with metal oxide layer 104, and the bottom surface of first electrode 103 is in contact with insulating layer 107a and fourth via 124.

First electrode 103, when viewed in plan view, is rectangular and has the same size as second electrode 106. First electrode 103 may contain, for example, at least one of tungsten, nickel, tantalum, titanium, aluminum, tantalum nitride, or titanium nitride. For instance, the above materials have standard electrode potentials lower than the standard electrode potential of the metal(s) of metal oxide layer 104. The higher the value of the standard electrode potential is, the material is less likely to oxidize. For instance, first electrode 103 contains tantalum nitride or titanium nitride, or is made of a stack of a tantalum nitride layer and a titanium nitride layer.

First electrode 103 is provided above insulating layer 107a. Metal oxide layer 104 and second electrode 106 are provided above first electrode 103.

Second electrode 106 is a planar electrode facing first electrode 103. Second electrode 106 has, as its two surfaces, a top surface (the surface on the positive side of the z-axis) and a bottom surface (the surface on the negative side of the z-axis). The bottom surface of second electrode 106 is in contact with metal oxide layer 104, and the top surface of second electrode 106 is in contact with metal layer 106s and the external air. Second electrode 106 includes, inside opening 106a, exposed portion 106e exposed to the external air. That is, opening 106a exposes the top surface of second electrode 106 between first terminal 111 and second terminal 112 when viewed in plan view, without the top surface being covered by insulating layer 107b. Opening 106a, which is above second electrode 106, passes through insulating layers 107b, 109a, 107c, and 109b. Here, a portion of the top surface of second electrode 106 serves as exposed portion 106e. Exposed portion 106e is a flat region to be exposed to a gas containing hydrogen.

In addition, second electrode 106 has a hydrogen dissociation property. Second electrode 106 includes a material having catalysis to dissociate hydrogen atoms from the gas containing hydrogen (more specifically, hydrogen atoms). Examples of the material include platinum, iridium, palladium, nickel, or an alloy containing at least one of the above metals. Here, second electrode 106 is platinum.

Metal layer 106s is provided on the portion, where opening 106a is not formed, of the top surface of second electrode 106. Metal layer 106s contains, for example, TiAlN and is provided as an etching stopper for forming first via 121, second via 122, and two third vias 123. However, metal layer 106s is not an essential structural element.

Metal oxide layer 104 is interposed between the two facing surfaces of first electrode 103 and second electrode 106. That is, metal oxide layer 104 is interposed between the top surface of first electrode 103 and the bottom surface of second electrode 106. Metal oxide layer 104 contains an oxygen-deficient metal oxide.

For instance, metal oxide layer 104 may be a metal oxide containing at least one of the following metals. At least one of aluminum and transition metals, such as tantalum, hafnium, titanium, zirconium, niobium, tungsten, nickel, and iron, may be selected as a metal of the metal oxide. Since transition metals can take on multiple oxidation states, different resistance states can be achieved by oxidation-reduction reaction.

Here, the level of oxygen deficiency of a metal oxide is the ratio of the deficient amount of oxygen in the metal oxide to the amount of oxygen in a metal oxide having a stoichiometric composition composed of the same elements as those of the metal oxide. Here, the deficient amount of oxygen is a value obtained by subtracting the amount of oxygen in the metal oxide from the amount of oxygen in the metal oxide having the stoichiometric composition. If there are two or more metal oxides having stoichiometric compositions composed of the same elements as those of the metal oxide, the level of oxygen deficiency of the metal oxide is defined on the basis of the one that has the highest resistance value out of the two or more metal oxides having the stoichiometric compositions. Metal oxides having stoichiometric compositions are more stable and have higher resistance values than metal oxides having other compositions. For example, when metal oxide layer 104 is a tantalum oxide, the metal oxide having a stoichiometric composition as defined above is $Ta_2O_5$. Thus, metal oxide layer 104 can be expressed as $TaO_{2.5}$. The level of oxygen deficiency of $TaO_{2.5}$ is 0%, and the level of oxygen deficiency of $TaO_{1.5}$ is (2.5−1.5)/2.5=40%. In addition, the level of oxygen deficiency of a metal oxide with excess oxygen indicates a negative value. It should be noted that in the present disclosure, unless otherwise noted, the level of oxygen deficiency can take a positive value, 0, or a negative value. A metal oxide with a low level of oxygen deficiency is closer to an oxide having a stoichiometric composition and thus has a high resistance value, whereas a metal oxide with a high level of oxygen deficiency is closer to a metal contained in the metal oxide and thus has a low resistance value.

Metal oxide layer 104 includes first layer 104a, second layer 104b, and discrete insulating layer 104i. First layer 104a is in contact with first electrode 103. Second layer 104b is above first layer 104a and in contact with first layer 104a and second electrode 106.

Second layer 104b has a level of oxygen deficiency lower than that of first layer 104a. For instance, first layer 104a is $TaO_x$, where $0<x<2.5$, and second layer 104b is $Ta_2O_5$ having a level of oxygen deficiency lower than that of first layer 104a. In addition, metal oxide layer 104 includes discrete insulating layer 104i at the perimeter portion thereof when viewed in plan view of first electrode 103.

The metal oxide contained in metal oxide layer 104 functions as a gas sensitive resistance film. Thus, the resistance value of metal oxide layer 104 is changed by exposed portion 106e of second electrode 106 being exposed to the gas containing hydrogen.

Here, when hydrogen is contained in the gas to which exposed portion 106e is exposed, the resistance value of metal oxide layer 104 decreases. More specifically, the more the hydrogen is contained, the smaller the resistance value becomes. In addition, the resistance value of metal oxide layer 104 reversibly changes according to whether hydrogen is contained in the gas to which exposed portion 106e is exposed.

The change in the resistance value can be explained as below. When exposed portion 106e is exposed to the gas containing hydrogen, hydrogen atoms are dissociated. The dissociated hydrogen atoms enter metal oxide layer 104. Thus, an impurity level is formed in metal oxide layer 104, which decreases the resistance value of metal oxide layer 104.

Furthermore, first electrode 103, metal oxide layer 104, second electrode 106, and metal layer 106s are surrounded by insulating layer 107b. Insulating layer 109a is provided above insulating layer 107b.

First via 121, second via 122, and two third vias 123 are provided above second electrode 106. First via 121, second via 122, and two third vias 123 pass through insulating layers 107b and 109a and vertically stand on metal layer 106s.

Insulating layers 107c and 109b are provided above insulating layer 109a. First terminal 111, second terminal 112, and two heat dissipation portions 130 are provided above first via 121, second via 122, and two third vias 123, respectively. First terminal 111, second terminal 112, and two heat dissipation portions 130 are spaced apart from each other.

First terminal 111 is electrically connected to second electrode 106 through first via 121 and metal layer 106s. That is, first via 121 is electrically connected to first terminal 111 and second electrode 106. It should be noted that hydrogen sensor 100 according to Embodiment 1 includes one first via 121. However, the number of first vias 121 is not limited to one, and hydrogen sensor 100 according to Embodiment 1 may include one or more first vias 121.

Second terminal 112 is electrically connected to second electrode 106 through second via 122 and metal layer 106s. That is, second via 122 is electrically connected to second terminal 112 and second electrode 106. It should be noted that hydrogen sensor 100 according to Embodiment 1 includes one second via 122. However, the number of second vias 122 is not limited to one, and hydrogen sensor 100 according to Embodiment 1 may include one or more second vias 122.

Openings 111a and 112a are provided above first terminal 111 and second terminal 112, respectively and pass through insulating layers 107c and 109b. First terminal 111 and second terminal 112 are connected, through openings 111a and 112a, to an external driving circuit for driving hydrogen sensor 100.

First terminal 111, second terminal 112, first via 121, and second via 122 are electrically conductive materials and may be metal materials having high electrical conductivity, such as aluminum, copper, silver, or gold.

As illustrated in FIG. 2, in plan view, first terminal 111 and second terminal 112 are arranged with exposed portion 106e being interposed therebetween. In the arrangement, when a predetermined voltage is applied across first terminal 111 and second terminal 112, exposed portion 106e of second electrode 106 is energized, that is, a current flows through exposed portion 106e. The passage of electric current through exposed portion 106e enhances hydrogen dissociation in exposed portion 106e. It should be noted that the predetermined voltage may be voltages having mutually opposite polarities.

In hydrogen sensor 100, the resistance value between first terminal 111 and second terminal 112 is changed by exposed portion 106e being exposed to the gas containing hydrogen during the passage of electric current through exposed portion 106e. The gas containing hydrogen is detected by the driving circuit detecting the change in the resistance value.

Third terminal 113 is electrically connected to first electrode 103 through fifth via 125, line 114, and fourth via 124. Fourth via 124 is provided below second electrode 106 and passes through insulating layers 107a and 102. Fourth via 124 is electrically connected to third terminal 113 and first electrode 103. In addition, as illustrated in FIG. 2, in plan view of first electrode 103, fourth via 124 overlaps exposed portion 106e. It should be noted that hydrogen sensor 100 according to Embodiment 1 includes one fourth via 124. However, the number of fourth vias 124 is not limited to one, and hydrogen sensor 100 according to Embodiment 1 may include one or more fourth vias 124.

Fifth via 125 is provided above line 114 and below third terminal 113 and passes through insulating layers 102, 107a, 107b, and 109a.

In addition, opening 113a is provided above third terminal 113 and passes through insulating layers 107c and 109b. Third terminal 113 is connected, through opening 113a, to the external driving circuit for driving hydrogen sensor 100.

In hydrogen sensor 100, the resistance value between first electrode 103 and second electrode 106 is changed by exposed portion 106e being exposed to the gas containing hydrogen during the passage of electric current through exposed portion 106e. In other words, in hydrogen sensor 100, the resistance value between first terminal 111 or second terminal 112 and third terminal 113 is changed by exposed portion 106e being exposed to the gas containing hydrogen during the passage of electric current through exposed portion 106e. The gas containing hydrogen is detected also by the driving circuit detecting the change in the resistance value.

It should be noted that insulating layers 102, 107a, 107b, 107c, 109a, and 109b, which cover the main parts of hydrogen sensor 100, are, for example, silicon oxide films or silicon nitride films.

In addition, a stack of first electrode 103, metal oxide layer 104, and second electrode 106 can be used as a memory cell of resistive random-access memory (ReRAM). In the resistive random-access memory, a digital memory cell is achieved by using the two states: a high-resistance state and a low-resistance state out of the states in which metal oxide layer 104 can take on. Hydrogen sensor 100 according to the present disclosure uses the high-resistance state out of the states in which metal oxide layer 104 can take on.

It should be noted that FIG. 1 illustrates an example in which metal oxide layer 104 has a two-layer structure made up of first layer 104a containing $TaO_x$ as a material and second layer 104b containing $Ta_2O_5$ having a low level of oxygen deficiency. However, metal oxide layer 104 may have a single-layer structure containing $Ta_2O_5$ having a low level of oxygen deficiency or $TaO_x$.

As illustrated in FIG. 2, in plan view, two third vias 123 are provided between first terminal 111 and second terminal 112. It should be noted that in Embodiment 1, first via 121, one third via 123, fourth via 124, other third via 123, and second via 122 are sequentially aligned in a straight line.

That is, two third vias 123 are provided on a current path from first terminal 111 to second terminal 112 through first via 121, second electrode 106, and second via 122. In other words, two third vias 123 are provided on a current path from first terminal 111 to third terminal 113 through first via 121, second electrode 106, metal oxide layer 104, first electrode 103, and fourth via 124.

In addition, each of two third vias 123 is in contact with heat dissipation portion 130. It should be noted that hydrogen sensor 100 according to Embodiment 1 includes two third vias 123. However, the number of third vias 123 is not limited to two, and hydrogen sensor 100 according to Embodiment 1 may include one or more third vias 123.

Two heat dissipation portions 130 are electrically isolated from one another. In addition, each of two heat dissipation portions 130 is electrically isolated from first terminal 111, second terminal 112, and third terminal 113. It should be noted that in Embodiment 1, first terminal 111, one heat dissipation portion 130, exposed portion 106e, other heat dissipation portion 130, and second terminal 112 are sequentially aligned in a straight line.

As illustrated in FIG. 2, in plan view, one of two heat dissipation portions 130 is provided between first terminal 111 and exposed portion 106e, and the other one of two heat dissipation portions 130 is provided between second terminal 112 and exposed portion 106e. In other words, the other one of two heat dissipation portions 130 is between third terminal 113 and exposed portion 106e.

Two heat dissipation portions 130 dissipate the heat of second electrode 106 (more specifically, exposed portion 106e), first via 121, second via 122, and fourth via 124. The heat of second electrode 106, first via 121, and second via 122 is dissipated from two heat dissipation portions 130 through metal layer 106s and two third vias 123. The heat of fourth via 124 is dissipated from two heat dissipation portions 130 through first electrode 103, metal oxide layer 104, second electrode 106, metal layer 106s, and two third vias 123. When for instance a voltage is applied to first terminal 111 and/or second terminal 112, two heat dissipation portions 130 dissipate the heat of exposed portion 106e, first via 121, and second via 122. When for instance a voltage is applied to first terminal 111 and/or third terminal 113, two heat dissipation portions 130 dissipate the heat of exposed portion 106e, first via 121, and fourth via 124.

Two openings 130a are provided above two heat dissipation portions 130 (so that one opening is above one heat dissipation portion), and pass through insulating layers 107c and 109b. The heat is dissipated to the outside of hydrogen sensor 100 through two openings 130a.

Two heat dissipation portions 130 and two third vias 123 are electrically conductive materials and may be metal materials having high thermal conductivity, such as aluminum, copper, silver, or gold. Without being limited to the above example, two heat dissipation portions 130 and two third vias 123 may be materials having low electrical conductivity and high thermal conductivity, such as a ceramic material.

First via 121, second via 122, and two third vias 123 may be the same material and, for example, copper. By using the same material, when manufacturing hydrogen sensor 100 according to Embodiment 1, it is possible to form first via 121, second via 122, and two third vias 123 at a time.

Here, the position of exposed portion 106e is described again.

As illustrated in FIG. 2, exposed portion 106e, when viewed in plan view, is provided between first terminal 111 and second terminal 112.

That is, exposed portion 106e is provided on the current path from first terminal 111 to second terminal 112 through first via 121, second electrode 106, and second via 122. In other words, exposed portion 106e is provided on the current path from first terminal 111 to third terminal 113 through first via 121, second electrode 106, metal oxide layer 104, first electrode 103, and fourth via 124.

Usage Example

Here, a method of detecting hydrogen by hydrogen sensor 100 according to Embodiment 1 is described using Usage Examples 1 and 2.

Usage Example 1

In Usage Example 1, hydrogen is detected according to the change in the resistance value between first terminal 111 and second terminal 112. In this case, an ammeter for measuring the current flowing between first terminal 111 and second terminal 112 of hydrogen sensor 100 is provided.

In Usage Example 1, a voltage is applied across first terminal 111 and second terminal 112. For instance, a potential of 0.75 V is applied to first terminal 111, a potential of 1.25 V is applied to second terminal 112, and a potential of 0 V is applied to third terminal 113. At this time, the current value of the current flowing through the ammeter is output from the ammeter. The resistance value between first terminal 111 and second terminal 112 is calculated from the output current value and the voltage value applied to hydrogen sensor 100.

Heat is generated in the current path by the current flowing between first terminal 111 and second terminal 112. When heat is generated in exposed portion 106e, which is part of the current path, the efficiency of dissociation of hydrogen atoms improves.

In hydrogen sensor 100, the resistance value between first terminal 111 and second terminal 112 is changed by exposed portion 106e being exposed to the gas containing hydrogen during the passage of electric current through exposed portion 106e. More specifically, the resistance value is changed due to the dissociated hydrogen atoms. The gas containing hydrogen is detected by the driving circuit detecting the change in the resistance value.

Usage Example 2

In Usage Example 2, hydrogen is detected according to the change in the resistance value between at least one of first terminal 111 or second terminal 112 and third terminal 113. In this case, an ammeter for measuring the current flowing between the at least one of first terminal 111 or second terminal 112 of hydrogen sensor 100 and third terminal 113 of hydrogen sensor 100 is provided.

In Usage Example 2, a voltage is applied across first terminal 111 and third terminal 113. For instance, a potential of 0.75 V is applied to first terminal 111, a potential of 1.25 V is applied to second terminal 112, and a potential of 0 V is applied to third terminal 113. At this time, the current value of the current flowing through the ammeter is output from the ammeter. The resistance value between the at least one of first terminal 111 or second terminal 112 and third terminal 113 is calculated from the output current value and the voltage value applied to hydrogen sensor 100. More specifically, the resistance value between first electrode 103 and second electrode 106 is calculated.

In hydrogen sensor 100, the resistance value between first electrode 103 and second electrode 106 is changed by exposed portion 106e being exposed to the gas containing hydrogen during the passage of electric current through exposed portion 106e. The gas containing hydrogen is detected by the driving circuit detecting the change in the resistance value. It should be noted that the applied voltage described above is a mere example, and a voltage to be applied is not limited to the above applied voltage.

Example and Comparison Example

Here, hydrogen sensor 100 according to Embodiment 1 is described in more detail by using an example and a comparison example.

Figure 3:
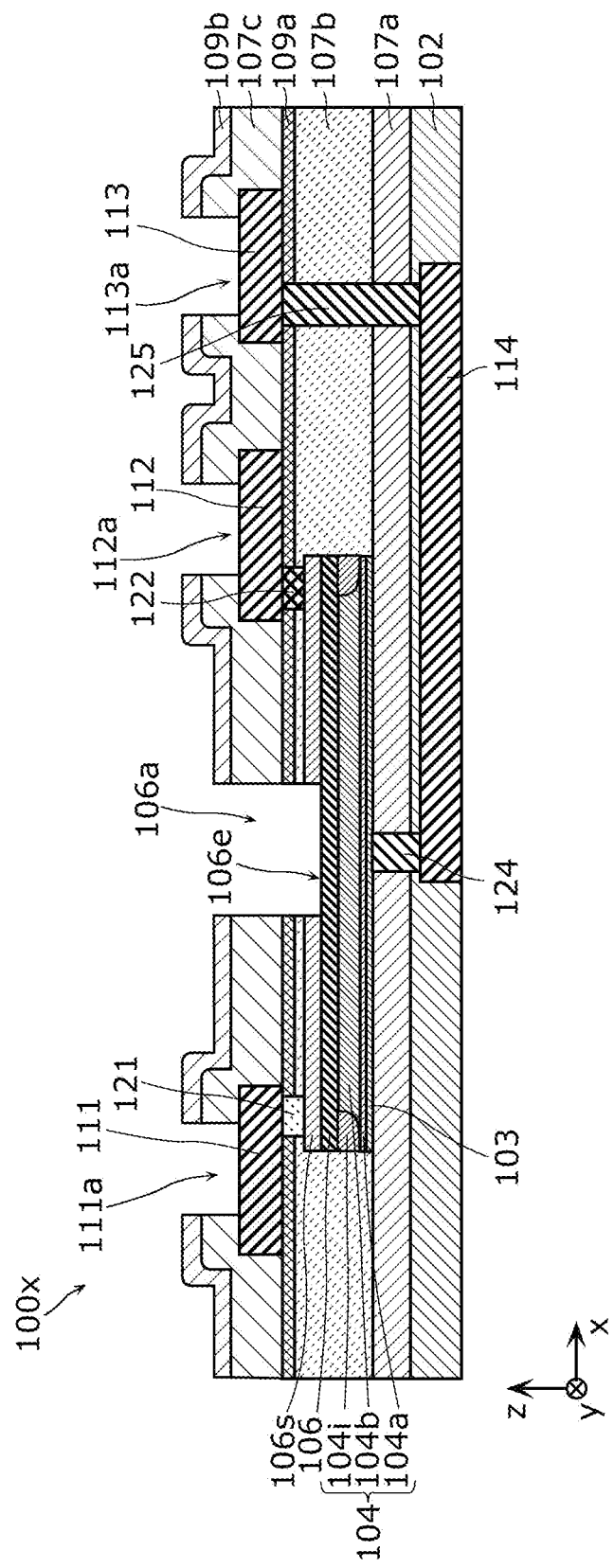
FIG. 3 is a cross-sectional view illustrating a configuration example of a hydrogen sensor according to a comparison example.

FIG. 3 is a cross-sectional view illustrating a configuration example of hydrogen sensor 100x according to the comparison example.

Hydrogen sensor 100 according to the example has the same configuration as hydrogen sensor 100 according to Embodiment 1. In addition, hydrogen sensor 100x according to the comparison example has the same configuration as hydrogen sensor 100 according to Embodiment 1 except that hydrogen sensor 100x does not include two third vias 123 or two heat dissipation portions 130.

Temperature Simulation

Temperature simulation is described.

FIG. 4 illustrates a table showing the results of temperature simulation of hydrogen sensor 100 according to the example and hydrogen sensor 100x according to the comparison example. More specifically, FIG. 4 shows the results of temperature simulation of exposed portion 106e and first via 121 when voltages are applied across first terminal 111 and second terminal 112.

As illustrated in FIG. 4, voltages are applied so that a current of 1 mA, a current of 5 mA, a current of 10.2 mA, a current of 15 mA, a current of 20 mA, a current of 25 mA, and a current of 30 mA flow between first terminal 111 and second terminal 112. Whichever current flows, the temperatures of exposed portion 106e and first via 121 are lower in hydrogen sensor 100 according to the example than in hydrogen sensor 100x according to the comparison example. In addition, each temperature difference between exposed portion 106e and first via 121 in hydrogen sensor 100 according to the example is equal to or greater than that in hydrogen sensor 100x according to the comparison example, which indicates that first via 121 in hydrogen sensor 100 according to the example is sufficiently cooled.

That is, the results show that inclusion of two third vias 123 and two heat dissipation portions 130 in hydrogen sensor 100 facilitates dissipation of heat generated in hydrogen sensor 100 (more specifically, exposed portion 106e and first via 121).

Transition of Current Value

The transition of a current value is described below.

Figure 5:
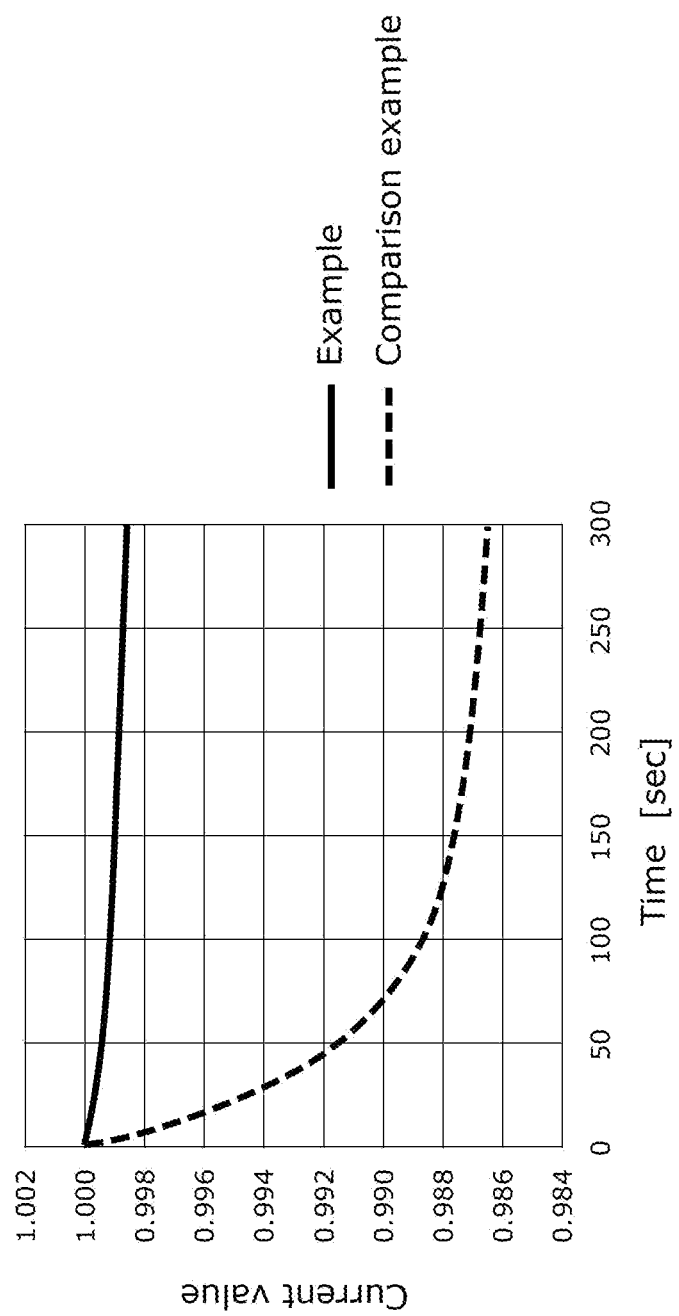
FIG. 5 illustrates the transition of a current value when a predetermined voltage is applied, in each of the hydrogen sensor according to the example and the hydrogen sensor according to the comparison example.

FIG. 5 illustrates the transition of the current value when a predetermined voltage is applied, in each of hydrogen sensor 100 according to the example and hydrogen sensor 100x according to the comparison example. More specifically, FIG. 5 illustrates the transition of the current value when a potential of 0 V is applied to first terminal 111, a potential of 0.5 V is applied to second terminal 112, and a potential of 0 V is applied to third terminal 113.

It should be noted that the current value is normalized so that the current value at the time point of 0 seconds in hydrogen sensor 100 and hydrogen sensor 100x is 1.

As illustrated in FIG. 5, in hydrogen sensor 100x according to the comparison example, the change in the current value with elapse of time is large. That is, in hydrogen sensor 100x, the current value gradually decreases from the initial current value (the current value at the time point of 0 seconds) as the time elapses. Typically, the resistance value of a via containing a metal material, such as first via 121, increases with an increase in the temperature. As illustrated in FIG. 4, in hydrogen sensor 100x, the temperature of first via 121 tends to increase, and thus the resistance value of first via 121 tends to increase. This results in the large change in the current value with elapse of time.

Meanwhile, as illustrated in FIG. 5, in hydrogen sensor 100 according to the example, the change in the current value with elapse of time is small, and a constant current is maintained. Two third vias 123 and two heat dissipation portions 130 facilitate dissipation of the heat of first via 121, which suppresses the resistance value of first via 121 from increasing. Accordingly, the current tends to be maintained at a constant value.

Detection of Hydrogen

Furthermore, detection of hydrogen is described.

Figure 6:
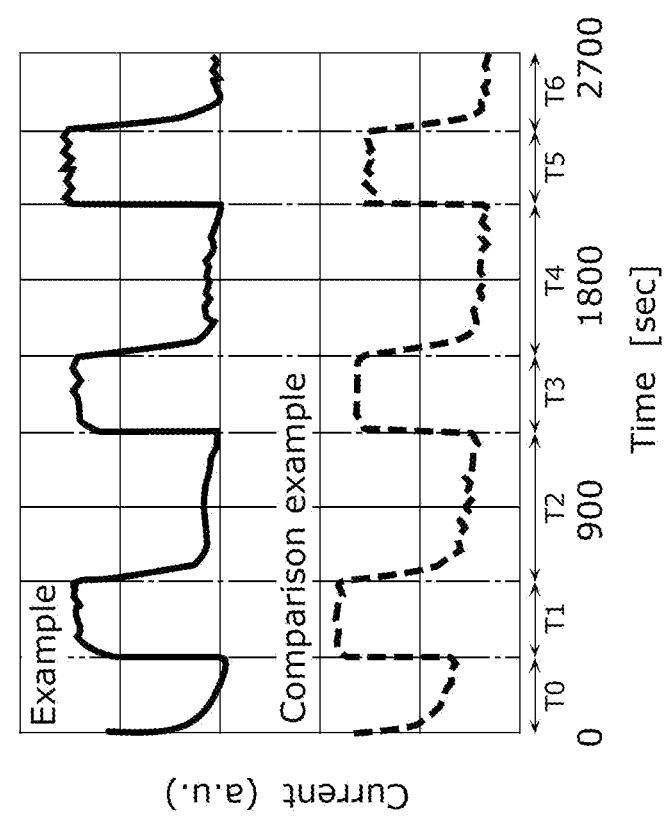
FIG. 6 illustrates the transition of a current value during detection of hydrogen in each of the hydrogen sensor according to the example and the hydrogen sensor according to the comparison example.

FIG. 6 illustrates the transition of the current value during detection of hydrogen in each of hydrogen sensor 100 according to the example and hydrogen sensor 100x according to the comparison example. Here, FIG. 6 illustrates the current flowing between first terminal 111 and second terminal 112. Hydrogen sensor 100 and hydrogen sensor 100x are exposed to a gas containing hydrogen during periods T1, T3, and T5, whereas hydrogen sensor 100 and hydrogen sensor 100x are not exposed to the gas containing hydrogen during periods T0, T2, T4, and T6. It should be noted that the gas contains hydrogen molecules and has a hydrogen molecule concentration of 500 ppm.

In hydrogen sensor 100, a constant current value is maintained across periods T1, T3, and T5. Even if hydrogen sensor 100 is repeatedly exposed to the gas containing hydrogen, the current value is stable without a significant change. Meanwhile, in hydrogen sensor 100x, the current value decreases gradually from T1 to T3 to T5, and the current value is unstable.

As described above, two third vias 123 and two heat dissipation portions 130 facilitate dissipation of the heat of first via 121, which suppresses the resistance value of first via 121 from increasing. Accordingly, when hydrogen sensor 100 is detecting hydrogen, the current value tends to be maintained at a constant value.

As described in [Usage Example], in hydrogen sensor 100 according to Embodiment 1, the resistance value between first terminal 111 and second terminal 112 is calculated from the output current value and the voltage value applied to hydrogen sensor 100. Furthermore, the gas containing hydrogen is detected on the basis of the resistance value. In hydrogen sensor 100 including two third vias 123 and two heat dissipation portions 130, also during detection of hydrogen, the current value of the current flowing between first terminal 111 and second terminal 112 tends to be maintained at a constant value. Thus, the resistance value between first terminal 111 and second terminal 112 can be calculated more accurately, and hydrogen is detected on the basis of the accurately calculated resistance value. Accordingly, hydrogen sensor 100 according to Embodiment 1 can detect hydrogen with high accuracy. It should be noted that also when a voltage is applied across at least one of first terminal 111 or second terminal 112 and third terminal 113 and the resistance value between first electrode 103 and second electrode 106 is calculated, the current value of the current flowing between first electrode 103 and second electrode 106 tends to be maintained at a constant value. Accordingly, similar advantageous effects can be expected.

As described in <Temperature Simulation> and <Transition of Current Value>, in hydrogen sensor 100, a voltage of several V and a current from several mA to several tens of mA are used, which means that hydrogen sensor 100 can detect hydrogen with a power consumption of several tens of mW. Accordingly, hydrogen sensor 100 according to Embodiment 1 is a low-power-consumption sensor.

In hydrogen sensor 100, a constant current value is maintained also across periods T2, T4, and T6, and the current value soon after hydrogen sensor 100 is exposed to the gas containing hydrogen is stable without a significant change. Meanwhile, in hydrogen sensor 100x, the current value gradually decreases from periods T2 to T4 to T6 and is unstable.

Advantageous Effects

Hydrogen sensor 100 according to Embodiment 1 includes first electrode 103 that is a planar electrode, second electrode 106 that is a planar electrode facing first electrode 103 and includes exposed portion 106e to be exposed to a gas containing hydrogen, metal oxide layer 104 interposed between the two facing surfaces of first electrode 103 and second electrode 106 and having the resistance value that is changed by exposed portion 106e being exposed to the gas, first terminal 111, second terminal 112, and heat dissipation portion 130 spaced apart from each other, one or more first vias 121 provided above second electrode 106 and electrically connected to first terminal 111 and second electrode 106, one or more second vias 122 provided above second electrode 106 and electrically connected to second terminal 112 and second electrode 106, and one or more third vias 123 that are provided above second electrode 106 and are in contact with heat dissipation portion 130.

In the above configuration, two third vias 123 and two heat dissipation portions 130 dissipate heat generated in hydrogen sensor 100 (e.g., first via 121). This suppresses the resistance values of the vias including first via 121 from increasing due to the heat. Thus, when hydrogen sensor 100 is detecting hydrogen, the current value tends to be maintained at a constant value. In hydrogen sensor 100 according to Embodiment 1, as described in <Usage Example 1>, the resistance value between first terminal 111 and second terminal 112 is calculated from an output current value and a voltage value applied to hydrogen sensor 100. Furthermore, the gas containing hydrogen is detected on the basis of the resistance value. In hydrogen sensor 100 including two third vias 123 and two heat dissipation portions 130, also during detection of hydrogen, the current value of the current flowing between first terminal 111 and second terminal 112 tends to be maintained at a constant value. Thus, the resistance value between first terminal 111 and second terminal 112 can be calculated more accurately, and hydrogen is detected on the basis of the accurately calculated resistance value. Accordingly, hydrogen sensor 100 according to Embodiment 1 can detect hydrogen with high accuracy.

Hydrogen sensor 100 can detect hydrogen with a power consumption of several tens of mW. Accordingly, hydrogen sensor 100 according to Embodiment 1 consumes less power than, for example, the gas sensor disclosed in Japanese Unexamined Patent Application Publication No. 2018-119846.

In Embodiment 1, heat dissipation portions 130 dissipate heat generated in exposed portion 106e, one or more first vias 121, and one or more second vias 122 by applying a voltage to first terminal 111 or second terminal 112.

This facilitates dissipation of the heat generated in exposed portion 106e, first via 121, and second via 122 when a voltage is applied to first terminal 111 or second terminal 112, which suppresses the temperatures of first via 121 and second via 122 from increasing. Thus, the current value of the current flowing between first terminal 111 and second terminal 112 tends to be maintained at a constant value. That is, hydrogen sensor 100 that can detect hydrogen with higher accuracy is achieved.

In Embodiment 1, exposed portion 106e is provided on the current path from first terminal 111 to second terminal 112 through one or more first vias 121, second electrode 106, and one or more second vias 122.

Heat is generated in the current path by the current flowing between first terminal 111 and second terminal 112. When heat is generated in exposed portion 106e, which is part of the current path, the efficiency of dissociation of hydrogen atoms improves. By facilitating dissociation of hydrogen atoms, the resistance value between first terminal 111 and second terminal 112 is more likely to change with high sensitivity. That is, hydrogen sensor 100 according to Embodiment 1 can detect hydrogen with higher accuracy.

In Embodiment 1, one or more third vias 123 are provided on the current path from first terminal 111 to second terminal 112 through one or more first vias 121, second electrode 106, and one or more second vias 122.

This facilitates heat dissipation from two heat dissipation portions 130. Thus, the current value of the current flowing between first terminal 111 and second terminal 112 tends to be maintained at a constant value. That is, hydrogen sensor 100 that can detect hydrogen with higher accuracy is achieved.

In Embodiment 1, when a voltage is applied across first terminal 111 and second terminal 112, exposure of exposed portion 106e to the gas changes the resistance value between first terminal 111 and second terminal 112.

Thus, the gas containing hydrogen can be detected on the basis of the change of the resistance value.

In Embodiment 1, the hydrogen sensor includes heat dissipation portions 130. In plan view of first electrode 103, one or more of heat dissipation portions 130 are provided between first terminal 111 and exposed portion 106e, and one or more other heat dissipation portions out of heat dissipation portions 130 are provided between second terminal 112 and exposed portion 106e.

This facilitates heat dissipation from two heat dissipation portions 130. Thus, the current value of the current flowing between first terminal 111 and second terminal 112 tends to be maintained at a constant value. That is, hydrogen sensor 100 that can detect hydrogen with higher accuracy is achieved.

Hydrogen sensor 100 according to Embodiment 1 includes first electrode 103 that is a planar electrode, second electrode 106 that is a planar electrode facing first electrode 103 and includes exposed portion 106e to be exposed to a gas containing hydrogen, metal oxide layer 104 interposed between the two facing surfaces of first electrode 103 and second electrode 106 and having the resistance value that is changed by exposed portion 106e being exposed to the gas, first terminal 111, third terminal 113, and heat dissipation portion 130 spaced apart from each other, one or more first vias 121 provided above second electrode 106 and electrically connected to first terminal 111 and second electrode 106, one or more fourth vias 124 provided below first electrode 103 and electrically connected to third terminal 113 and first electrode 103, and one or more third vias 123 that are provided above second electrode 106 and are in contact with heat dissipation portion 130.

In the above configuration, two third vias 123 and two heat dissipation portions 130 dissipate heat generated in hydrogen sensor 100 (e.g., first via 121). This suppresses the resistance values of the vias including first via 121 from increasing due to the heat. Thus, when hydrogen sensor 100 is detecting hydrogen, the current value tends to be maintained at a constant value. In hydrogen sensor 100 according to Embodiment 1, as described in <Usage Example 2>, the resistance value between first electrode 103 and second electrode 106 is calculated from the output current value and the voltage value applied to hydrogen sensor 100. Furthermore, the gas containing hydrogen is detected on the basis of the resistance value. In hydrogen sensor 100 including two third vias 123 and two heat dissipation portions 130, also during detection of hydrogen, the current value of the current flowing between first electrode 103 and second electrode 106 tends to be maintained at a constant value. Thus, the resistance value between first electrode 103 and second electrode 106 can be calculated more accurately, and hydrogen is detected on the basis of the accurately calculated resistance value. Accordingly, hydrogen sensor 100 according to Embodiment 1 can detect hydrogen with high accuracy.

Hydrogen sensor 100 can detect hydrogen with a power consumption of several tens of mW. Accordingly, hydrogen sensor 100 according to Embodiment 1 consumes less power than, for example, the gas sensor disclosed in Japanese Unexamined Patent Application Publication No. 2018-119846.

In Embodiment 1, heat dissipation portions 130 dissipate heat generated in exposed portion 106e, one or more first vias 121, and one or more fourth vias 124 by applying a voltage to first terminal 111 or third terminal 113.

This facilitates dissipation of the heat generated in exposed portion 106e, first via 121, and fourth via 124 when a voltage is applied to first terminal 111 or third terminal 113, which suppresses the temperatures of first via 121 and fourth via 124 from increasing. Thus, the current value of the current flowing between first electrode 103 and second electrode 106 tends to be maintained at a constant value. That is, hydrogen sensor 100 that can detect hydrogen with higher accuracy is achieved.

In Embodiment 1, exposed portion 106e is provided on the current path from first terminal 111 to third terminal 113 through one or more first vias 121, second electrode 106, metal oxide layer 104, first electrode 103, and one or more fourth vias 124.

Heat is generated in the current path by the current flowing between first electrode 103 and second electrode 106. When heat is generated in exposed portion 106e, which is part of the current path, the efficiency of dissociation of hydrogen atoms improves. By facilitating dissociation of hydrogen atoms, the resistance value between first electrode 103 and second electrode 106 is more likely to change with high sensitivity. That is, hydrogen sensor 100 according to Embodiment 1 can detect hydrogen with higher accuracy.

In Embodiment 1, one or more third vias 123 are provided on the current path from first terminal 111 to third terminal 113 through one or more first vias 121, second electrode 106, metal oxide layer 104, first electrode 103, and one or more fourth vias 124.

This facilitates heat dissipation from two heat dissipation portions 130. Thus, the current value of the current flowing between first electrode 103 and second electrode 106 tends to be maintained at a constant value. That is, hydrogen sensor 100 that can detect hydrogen with higher accuracy is achieved.

In Embodiment 1, when a voltage is applied across first terminal 111 and third terminal 113, exposure of exposed portion 106e to the gas changes the resistance value between first electrode 103 and second electrode 106.

Thus, the gas containing hydrogen can be detected on the basis of the change in the resistance value.

In Embodiment 1, in plan view of first electrode 103, one or more fourth vias 124 overlap exposed portion 106e.

Thus, for example, as described in Embodiment 1, in a case where exposed portion 106e, when viewed in plan view, is disposed between two heat dissipation portions 130, the distances between fourth via 124 and two heat dissipation portions 130 tend to be short. This facilitates dissipation of the heat of fourth via 124 from two heat dissipation portions 130. Thus, the current value of the current flowing between first electrode 103 and second electrode 106 tends to be maintained at a constant value. That is, hydrogen sensor 100 that can detect hydrogen with higher accuracy is achieved.

Hydrogen sensor 100 according to Embodiment 1 includes heat dissipation portions 130. In plan view of first electrode 103, one or more of heat dissipation portions 130 are provided between first terminal 111 and exposed portion 106e, and one or more other heat dissipation portions out of heat dissipation portions 130 are provided between third terminal 113 and exposed portion 106e.

This facilitates heat dissipation from two heat dissipation portions 130. Thus, the current value of the current flowing between first electrode 103 and second electrode 106 tends to be maintained at a constant value. That is, hydrogen sensor 100 that can detect hydrogen with higher accuracy is achieved.

Hydrogen sensor 100 according to Embodiment 1 includes first electrode 103 that is a planar electrode, second electrode 106 that is a planar electrode facing first electrode 103 and includes exposed portion 106e to be exposed to a gas containing hydrogen, metal oxide layer 104 interposed between the two facing surfaces of first electrode 103 and second electrode 106 and having the resistance value that is changed by exposed portion 106e being exposed to the gas, first terminal 111, second terminal 112, third terminal 113, and heat dissipation portion 130 spaced apart from each other, one or more first vias 121 provided above second electrode 106 and electrically connected to first terminal 111 and second electrode 106, one or more second vias 122 provided above second electrode 106 and electrically connected to second terminal 112 and second electrode 106, one or more third vias 123 that are provided above second electrode 106 and are in contact with heat dissipation portion 130, and one or more fourth vias 124 provided below first electrode 103 and electrically connected to third terminal 113 and first electrode 103.

In the above configuration, both usage methods, <Usage Example 1> and <Usage Example 2> are used in hydrogen sensor 100 according to Embodiment 1. Accordingly, as described above, hydrogen sensor 100 according to Embodiment 1 can detect hydrogen with high accuracy.

Hydrogen sensor 100 can detect hydrogen with a power consumption of several tens of mW. Accordingly, hydrogen sensor 100 according to Embodiment 1 consumes less power than, for example, the gas sensor disclosed in Japanese Unexamined Patent Application Publication No. 2018-119846.

Embodiment 2

Configuration

Figure 7:
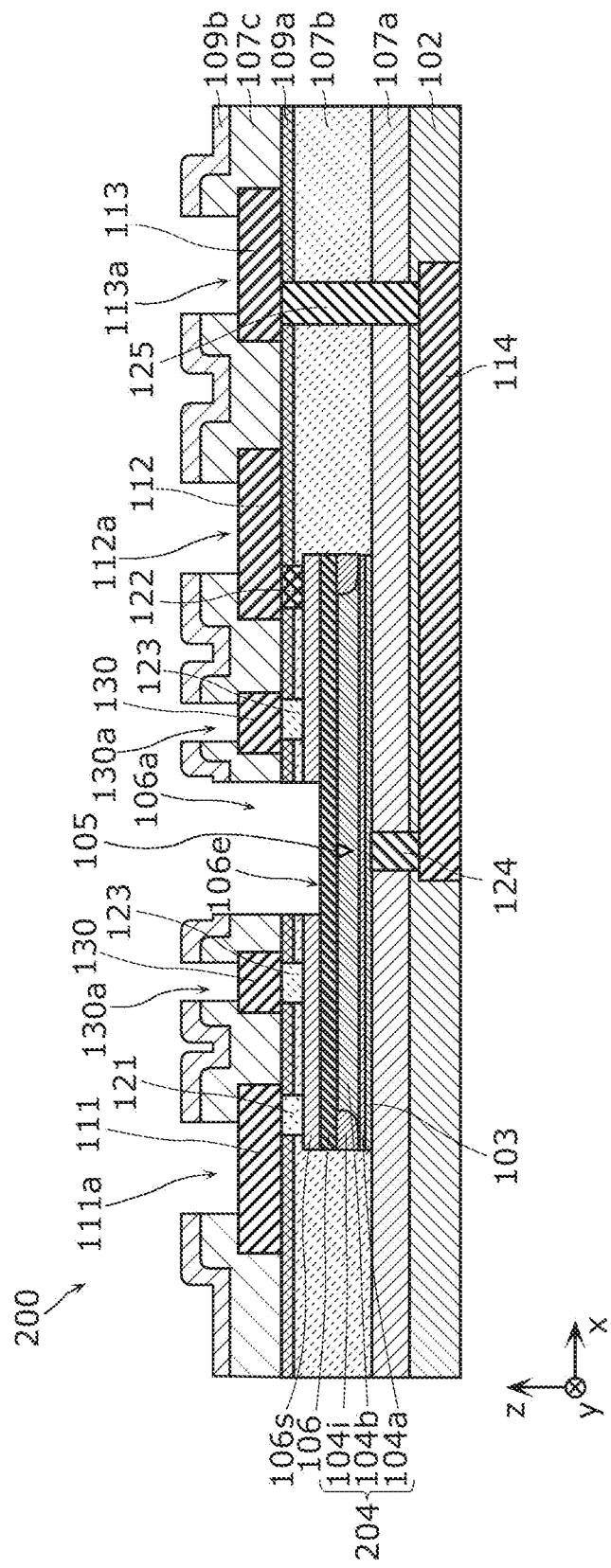
FIG. 7 is a cross-sectional view illustrating a configuration example of a hydrogen sensor according to Embodiment 2.

A configuration of hydrogen sensor 200 according to Embodiment 2 is described below. FIG. 7 is a cross-sectional view illustrating a configuration example of hydrogen sensor 200 according to Embodiment 2.

Hydrogen sensor 200 has the same configuration as hydrogen sensor 100 according to Embodiment 1 except that hydrogen sensor 200 includes metal oxide layer 204. Hydrogen sensor 200 includes first electrode 103, metal oxide layer 204, second electrode 106, metal layer 106s, first via 121, second via 122, two third vias 123, fourth via 124, fifth via 125, first terminal 111, second terminal 112, third terminal 113, two heat dissipation portions 130, and line 114. Hydrogen sensor 200 further includes insulating layers 102, 107a, 107b, 107c, 109a, and 109b that cover the above structural elements.

Furthermore, metal oxide layer 204 has the same configuration as metal oxide layer 104 except that metal oxide layer 204 includes a bulk region and local region 105. That is, metal oxide layer 204 includes first layer 104a, second layer 104b, discrete insulating layer 104i, the bulk region, and local region 105.

More specifically, second layer 104b of metal oxide layer 204 includes the bulk region and local region 105 surrounded by the bulk region. It should be noted that the bulk region is the portion other than local region 105 within second layer 104b in FIG. 7.

Local region 105 is in contact with second electrode 106 and not in contact with first electrode 103. The level of oxygen deficiency of local region 105 is higher than that of the bulk region. The level of oxygen deficiency of a metal oxide contained in local region 105 reversibly changes according to application of an electrical signal between first electrode 103 and second electrode 106 and the presence or absence of hydrogen in the gas to which exposed portion 106e is exposed. Local region 105 is a minute region containing a filament including an oxygen deficient site. The filament functions as a conductive path.

When an initial break voltage is applied across first electrode 103 and second electrode 106, local region 105 is formed inside metal oxide layer 204. To enable reversible transition of metal oxide layer 204 between a high-resistance state and a low-resistance state, the initial break voltage may have an absolute value greater than that of a normal write voltage applied across first electrode 103 and second electrode 106. The initial break voltage may have an absolute value smaller than that of the write voltage. In this case, the initial break voltage may be repeatedly applied or applied continuously for a predetermined period of time. By application of the initial break voltage, as illustrated in FIG. 7, local region 105 in contact with second electrode 106 and not in contact with first electrode 103 is formed inside metal oxide layer 204.

Local region 105 may be formed at only one portion of metal oxide layer 204 of hydrogen sensor 200. The number of local regions 105 in metal oxide layer 204 can be checked by, for example, electron beam absorbed current (EBAC) analysis.

By forming local region 105 inside metal oxide layer 204, when a voltage is applied across first electrode 103 and second electrode 106, the current inside metal oxide layer 204 flows concentratedly through local region 105. That is, the current flows more readily through local region 105 than through the bulk region.

For the smallness of local region 105, the temperature of local region 105 is significantly increased by, for example, heat generated by a current of around several tens of $\mu$A that flows when a voltage of around 1 V is applied to read the resistance value (that is, a power consumption less than 0.1 mW).

Thus, second electrode 106 contains a metal that acts as a catalyst, such as Pt. The efficiency of dissociation of hydrogen atoms from the gas containing hydrogen (more specifically, hydrogen atoms) is improved by the portion of second electrode 106 that is in contact with local region 105 being heated with heat generated in local region 105.

As a result, when the gas to be examined contains hydrogen, the hydrogen atoms dissociated in second electrode 106 are bonded with oxygen atoms inside local region 105, which decreases the resistance value of local region 105.

Thus, as a feature of hydrogen sensor 200, the resistance value of metal oxide layer 204 is decreased by exposed portion 106e being exposed to the gas containing hydrogen. Because of the feature, when exposed portion 106e is exposed to the gas to be examined and the resistance value between first electrode 103 and second electrode 106 is decreased, hydrogen contained in the gas can be detected.

It should be noted that regardless of whether local region 105 is in a high-resistance state or in a low-resistance state, the resistance value is further decreased by exposed portion 106e being exposed to the gas containing hydrogen. Accordingly, hydrogen can be detected by hydrogen sensor 200 in which local region 105 is in the high-resistance state or in the low-resistance state. However, hydrogen sensor 200 in which local region 105 is preset to an electrically high-resistance state may be used to detect a decrease in the resistance value more clearly.

Advantageous Effects

In Embodiment 2, metal oxide layer 204 includes the bulk region and local region 105 surrounded by the bulk region, and a current flows more readily through local region 105 than through the bulk region.

Thus, the temperature of local region 105 is significantly increased by heat generated by a current of around several tens of μA (that is, a power consumption less than 0.1 mW) that flows when a voltage of around 1 V is applied to read the resistance value. The efficiency of dissociation of hydrogen atoms is improved by the portion of second electrode 106 that is in contact with local region 105 being heated with heat generated in local region 105. By facilitating dissociation of the hydrogen atoms, the resistance value between first terminal 111 and second terminal 112 or the resistance value between first electrode 103 and second electrode 106 is more likely to change with high sensitivity. That is, hydrogen sensor 200 according to Embodiment 2 can detect hydrogen with higher accuracy. As described above, hydrogen sensor 200 according to Embodiment 2 can detect hydrogen with a power consumption less than 0.1 mW. Accordingly, hydrogen sensor 200 according to Embodiment 2 is a low-power-consumption sensor.

In Embodiment 2, metal oxide layer 204 contains an oxygen-deficient metal oxide, and the level of oxygen deficiency of local region 105 is higher than that of the bulk region.

Thus, the current flows more readily through local region 105 than through the bulk region.

Embodiment 3

Figure 8:
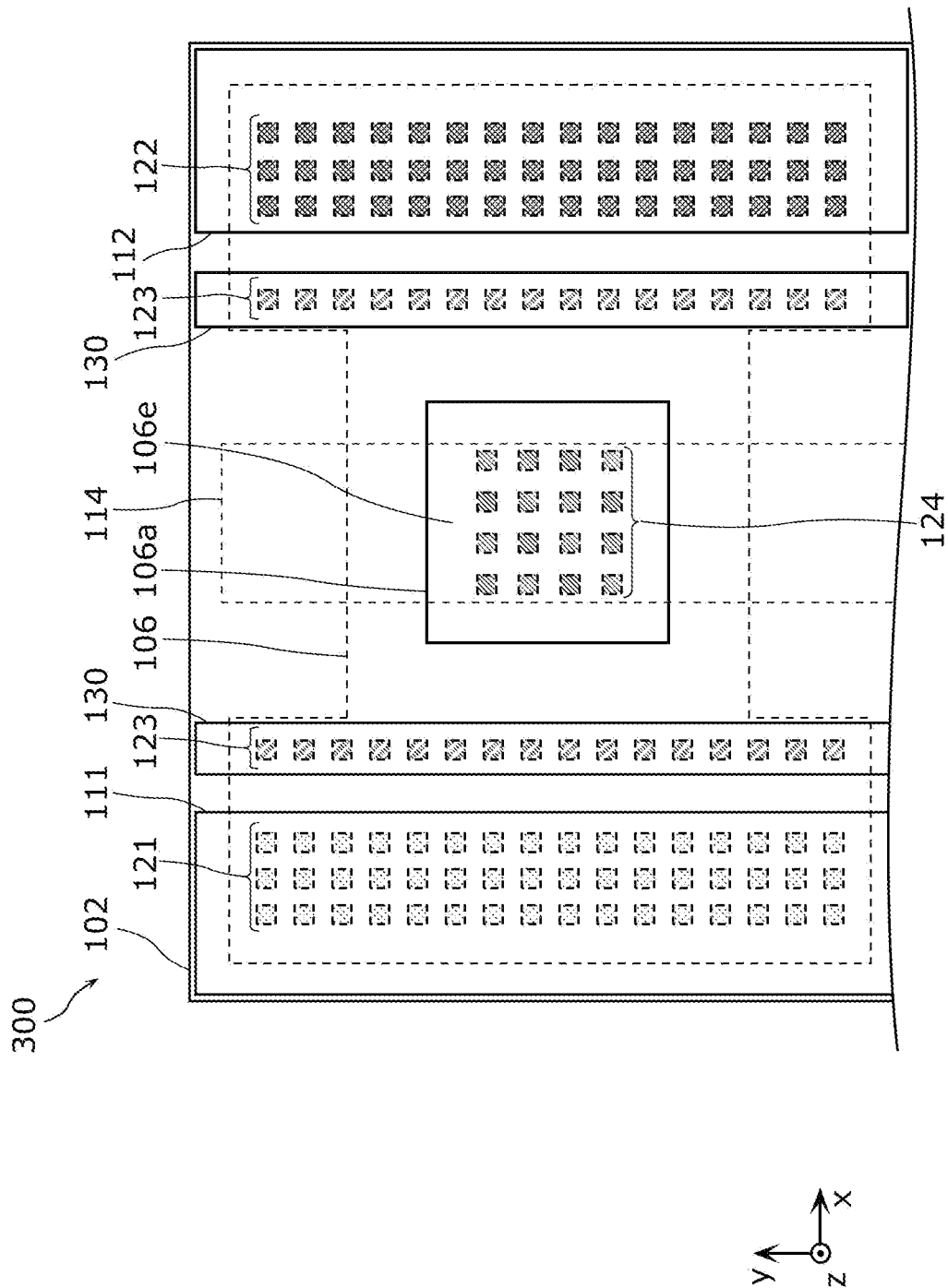
FIG. 8 is a plan view illustrating a configuration example of a hydrogen sensor according to Embodiment 3.

A configuration of hydrogen sensor 300 according to Embodiment 3 is described below. FIG. 8 is a plan view illustrating a configuration example of hydrogen sensor 300 according to Embodiment 3. FIG. 8 is a plan view comparable to FIG. 2.

Hydrogen sensor 300 has the same configuration as hydrogen sensor 100 according to Embodiment 1 except mainly that hydrogen sensor 300 includes first vias 121, second vias 122, third vias 123, and fourth vias 124. That is, hydrogen sensor 300 includes first electrode 103, metal oxide layer 104, second electrode 106, metal layer 106s, first vias 121, second vias 122, third vias 123, fourth vias 124, fifth via 125, first terminal 111, second terminal 112, third terminal 113, two heat dissipation portions 130, and line 114. Hydrogen sensor 300 further includes insulating layers 102, 107a, 107b, 107c, 109a, and 109b that cover the structural elements.

It should be noted that in FIG. 8, the same kind of hatching pattern is given to each of first vias 121 for identification. The same applies to second vias 122, third vias 123, and fourth vias 124.

All first vias 121 are provided above second electrode 106 and electrically connected to first terminal 111 and second electrode 106. All second vias 122 are provided above second electrode 106 and electrically connected to second terminal 112 and second electrode 106.

All third vias 123 are provided above second electrode 106 and, each of third vias 123 is in contact with one of two heat dissipation portions 130.

All fourth vias 124 are provided below first electrode 103 and electrically connected to third terminal 113 and first electrode 103. In addition, in plan view of first electrode 103, all fourth vias 124 overlap exposed portion 106e.

First electrode 103, metal oxide layer 104, and second electrode 106 have the same H-shape when viewed in plan view.

Hydrogen sensor 300 having the above configuration is also a low-power-consumption sensor that can detect hydrogen with high accuracy.

OTHER EMBODIMENTS

The hydrogen sensors according to the present disclosure are described above on the basis of the embodiments. However, the present disclosure is not limited to the embodiments.

For instance, the present disclosure includes one or more embodiments achieved by making, within the spirit of the present disclosure, various changes conceived by those skilled in the art to the above embodiments and one or more embodiments achieved by optionally combining, within the spirit of the present disclosure, the structural elements and functions in the embodiments.

In addition, in the above embodiments, various changes, replacement, addition, and omission can be performed within the scope of the claims or the equivalent scope thereof.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The hydrogen sensors according to the present disclosure can be widely used for, for example, detecting leakage of a gas containing hydrogen.

The invention claimed is:
1. A hydrogen sensor comprising:
a first electrode that is a planar electrode;
a second electrode that is a planar electrode facing the first electrode and includes an exposed portion to be exposed to a gas containing hydrogen;

a metal oxide layer interposed between two facing surfaces of the first electrode and the second electrode and having a resistance value that is changed by the exposed portion being exposed to the gas;
a first terminal, a second terminal, and a plurality of heat dissipation portions spaced apart from each other;
one or more first vias provided above the second electrode and electrically connected to the first terminal and the second electrode;
one or more second vias provided above the second electrode and electrically connected to the second terminal and the second electrode; and
a plurality of third vias that are provided above the second electrode and are in contact with the plurality of heat dissipation portions, respectively,
wherein in plan view of the first electrode,
one or more of the plurality of heat dissipation portions are provided between the first terminal and the exposed portion, and
one or more other heat dissipation portions out of the plurality of heat dissipation portions are provided between the second terminal and the exposed portion.

2. The hydrogen sensor according to claim 1, wherein the plurality of heat dissipation portions dissipate heat generated in the exposed portion, the one or more first vias, and the one or more second vias by applying a voltage to the first terminal or the second terminal.

3. The hydrogen sensor according to claim 1, wherein the exposed portion is provided on a current path from the first terminal to the second terminal through the one or more first vias, the second electrode, and the one or more second vias.

4. The hydrogen sensor according to claim 1, wherein the plurality of third vias are provided on a current path from the first terminal to the second terminal through the one or more first vias, the second electrode, and the one or more second vias.

5. The hydrogen sensor according to claim 1, wherein when a voltage is applied across the first terminal and the second terminal, exposure of the exposed portion to the gas changes a resistance value between the first terminal and the second terminal.

6. The hydrogen sensor according to any one of claims 1 to 5, wherein the metal oxide layer includes a bulk region and a local region surrounded by the bulk region, and
a current flows more readily through the local region than through the bulk region.

7. A hydrogen sensor comprising:
a first electrode that is a planar electrode;
a second electrode that is a planar electrode facing the first electrode and includes an exposed portion to be exposed to a gas containing hydrogen;
a metal oxide layer interposed between two facing surfaces of the first electrode and the second electrode and having a resistance value that is changed by the exposed portion being exposed to the gas;
a first terminal, a third terminal, and a plurality of heat dissipation portions spaced apart from each other;
one or more first vias provided above the second electrode and electrically connected to the first terminal and the second electrode;
one or more fourth vias provided below the first electrode and electrically connected to the third terminal and the first electrode; and a plurality of third vias that are provided above the second electrode and are in contact with the plurality of heat dissipation portions, respectively,
wherein in plan view of the first electrode,
one or more of the plurality of heat dissipation portions are provided between the first terminal and the exposed portion, and
one or more other heat dissipation portions out of the plurality of heat dissipation portions are provided between the third terminal and the exposed portion.

8. The hydrogen sensor according to claim 7, wherein the plurality of heat dissipation portions dissipate heat generated in the exposed portion, the one or more first vias, and the one or more fourth vias by applying a voltage to the first terminal or the third terminal.

9. The hydrogen sensor according to claim 7, wherein the exposed portion is provided on a current path from the first terminal to the third terminal through the one or more first vias, the second electrode, the metal oxide layer, the first electrode, and the one or more fourth vias.

10. The hydrogen sensor according to claim 7, wherein the plurality of third vias are provided on a current path from the first terminal to the third terminal through the one or more first vias, the second electrode, the metal oxide layer, the first electrode, and the one or more fourth vias.

11. The hydrogen sensor according to claim 7, wherein when a voltage is applied across the first terminal and the third terminal, exposure of the exposed portion to the gas changes a resistance value between the first electrode and the second electrode.

12. The hydrogen sensor according to claim 7, wherein in plan view of the first electrode, the one or more fourth vias overlap the exposed portion.

13. The hydrogen sensor according to any one of claims 7 to 12, wherein the metal oxide layer includes a bulk region and a local region surrounded by the bulk region, and
a current flows more readily through the local region than through the bulk region.

14. A hydrogen sensor comprising:
a first electrode that is a planar electrode;
a second electrode that is a planar electrode facing the first electrode and includes an exposed portion to be exposed to a gas containing hydrogen;
a metal oxide layer interposed between two facing surfaces of the first electrode and the second electrode and having a resistance value that is changed by the exposed portion being exposed to the gas;
a first terminal, a second terminal, a third terminal, and a plurality of heat dissipation portions spaced apart from each other;
one or more first vias provided above the second electrode and electrically connected to the first terminal and the second electrode;
one or more second vias provided above the second electrode and electrically connected to the second terminal and the second electrode;
a plurality of third vias that are provided above the second electrode and are in contact with the plurality of heat dissipation portions, respectively; and
one or more fourth vias provided below the first electrode and electrically connected to the third terminal and the first electrode,
wherein in plan view of the first electrode, one or more of the plurality of heat dissipation portions are provided between the first terminal and the exposed portion, and one or more other heat dissipation portions out of the plurality of heat dissipation portions are provided between the second terminal and the exposed portion.

15. The hydrogen sensor according to claim 14,
wherein the metal oxide layer includes a bulk region and a local region surrounded by the bulk region, and
a current flows more readily through the local region than through the bulk region.

* * * * *